Feb. 8, 1927.
W. GOWER
1,616,447
CLIPPING DEVICE
Filed March 12, 1926
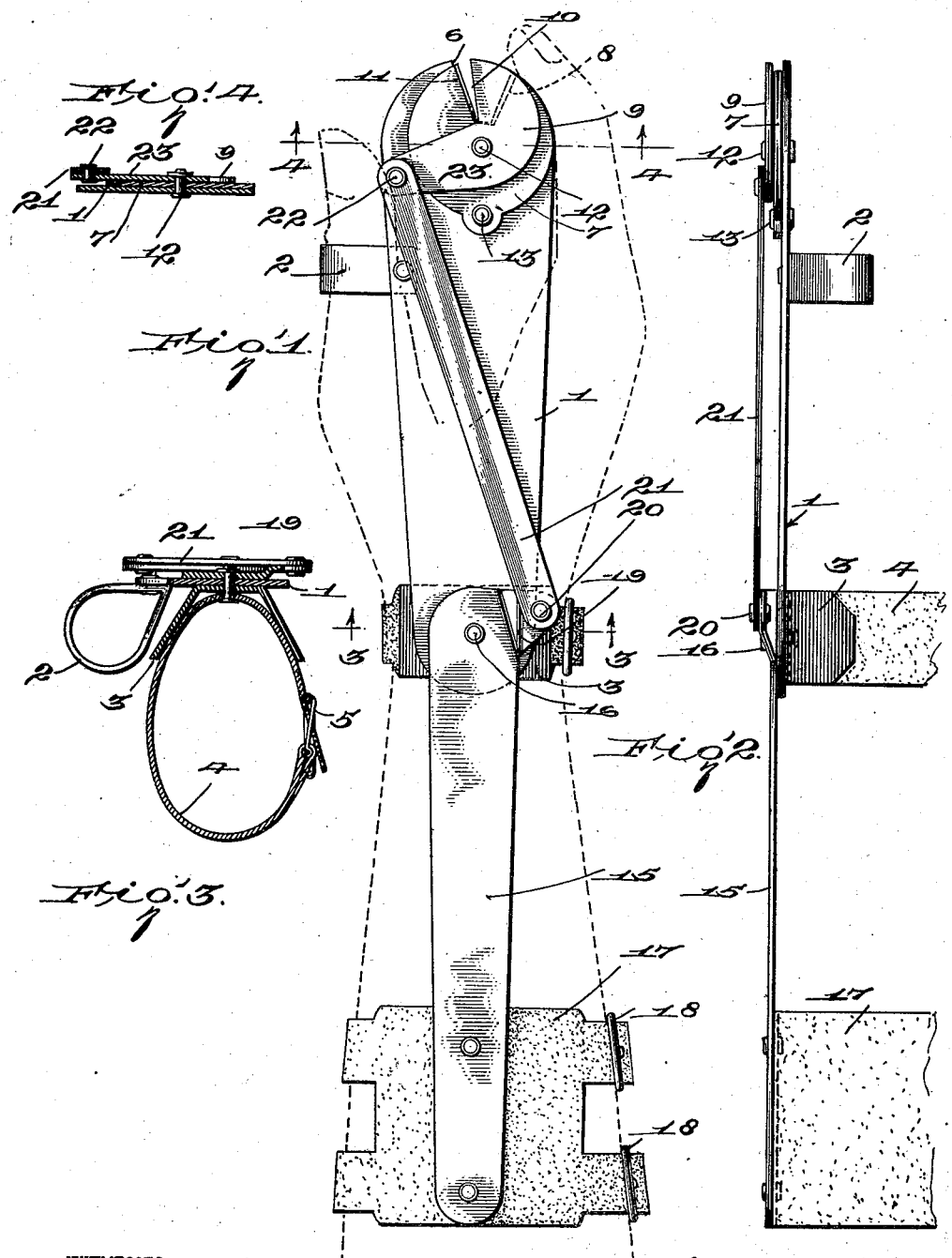
INVENTOR
Walter Gower
BY
ATTORNEYS Patented Feb. 8, 1927.

1,616,447

UNITED STATES PATENT OFFICE.

WALTER GOWER, OF TAMPA, FLORIDA.

CLIPPING DEVICE.

Application filed March 12, 1926. Serial No. 94,306.

This invention relates to an improvement in clipping devices especially designed for use in gathering fruits, vegetables, and flowers, as well as for light pruning and for cutting or clipping various objects and things.

The object of the invention is to provide a clipping device having these advantages and capacities which may be operated by wrist movement of one hand in such manner that all of the fingers of the hand, except the thumb, are free, thereby enhancing the control of the clipping device and making it more flexible and convenient in operation. As the clipping device is operated by a wrist movement its use is less tiring on the operator than it would be if operated by the fingers. The advantage of constituting the clipping device so that it is operated and controlled by one hand only resides in the fact that the other hand is left free for holding on to a ladder or other support or for supporting a basket or other container, a feature of considerable advantage when gathering fruits, vegetables or flowers.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 1 is a view in elevation showing a clipping device embodying the present invention mounted on the hand and arm of the operator, Figure 2 is a view in edge elevation illustrating the clipping device shown in Fig. 1 prior to application to the arm and hand of the operator, Figure 3 is a view in section on line 3—3 of Fig. 1, and Figure 4 is a view in section on line 4—4 of Fig. 1.

Referring to the drawings it will be seen that the clipping device constituting the present invention comprises a body or supporting plate 1 having adjacent its forward end a thumb receiving band or member 2, the member 2 being located at one edge of the plate 1 and being riveted or otherwise suitably secured thereto. The rear end of the plate 1 is mounted on and fastened to the wrist of the operator by means of a metal gripper 3 of substantially U-shaped form and a flexible wrist encircling band or strap 4 located within the metal gripper 3 so as to line the same and having a buckle 5 for securing its ends together in any desired adjustment.

The forward end of the plate 1 is provided with a notch or opening 6. A fixed cutter 7 is secured to the forward end of the plate 1 and has a notch 8 which registers with the notch of the plate 1. A movable or rotatable cutter 9 is provided and coacts with the fixed cutter 7, the movable cutter having a radial cutting edge 10, which coacts with a similarly extending edge 11 provided on the fixed cutter 7. The cutting edges 10 and 11 are bevelled and the contacting faces of the cutters are ground to a proper bearing and fit. The rotatable cutter 9 is pivoted to the plate 1 and also to the fixed cutter 7 by means of a pivot pin 12, the pivot pin 12 coacting with a fixed pin 13 to secure and hold the fixed cutter 7 in position.

In order that the wrist movement may operate the clipper, that is cause the cutter 9 to rotate so as to cause its cutting edge 10 to traverse the cutting edge 11 of the fixed cutter, an operating member designated generally at 15 is provided, and has one end pivotally connected as at 16 to the means provided for securing the clipper to the wrist of the operator. The rearward end of the lever 15 is fastened to a forearm encircling band or strap 17 having buckles 18 for securing it in any adjustment on the forearm. The forward end of the lever 15 is provided with an offset angular extension 19 which is pivotally connected as at 20 to one end of the connecting bar or link 21, the other end of the connecting bar or link 21 being pivotally connected as at 22 to an arm 23 provided on the movable cutter 9.

In operation the clipping device is strapped on the wrist and forearm of the operator and the operator's thumb is inserted through the thumb receiving member 2 as illustrated in Fig. 1 of the drawing. If desired the index finger may be used to steady the clipping device by clasping the rounded edge of the plate 1. When thus mounted on the arm of the operator the flexure of the wrist of the operator will actuate the rotatable cutter to carry out the cutting or clipping action, and it is obvious that this may be done without tiring the operator. It is to be understood that while the cutting edge 11 extends substantially radially, it may depart from the radial to an extent sufficient to cause the outer ends of the cutting edges to close at substantially the same time as the inner edges.

I claim:

1. A clipping device including a mounting plate, means for fastening the mounting plate to the hand and wrist of the wearer, a fixed cutter secured to the mounting plate, a movable cutter cooperable with the fixed cutter, and means operable by flexure of the wrist of the operator for actuating the movable cutter and including a lever pivoted to the mounting plate and fastened to the forearm and having an angular extension, said movable cutter having an arm, and a link connecting the arm and the extension.

2. A clipping device including a mounting plate, means for fastening the mounting plate to the hand and wrist of the wearer, a fixed cutter secured to the mounting plate, a rotatable cutter pivoted to the fixed cutter and to the mounting plate, a lever fulcrumed to the rear end of the mounting plate, means for fastening the rear end of the lever to the forearm and motion transmission means between the forward end of the lever and the rotatable cutter.

3. A clipping device including a mounting plate, means for fastening the mounting plate to the hand and wrist of the wearer, a fixed cutter secured to the mounting plate, a rotatable cutter pivoted to the fixed cutter and to the mounting plate, a lever fulcrumed to the rear end of the mounting plate, means for fastening the rear end of the lever to the forearm, said lever having an angular extension at its forward end, said rotary cutter having an arm, and a link pivotally connected at one end to the arm, and at its other end to the angular extension.

4. A clipping device including a body plate, means for securing the inner end of the body plate to the wrist of the operator, a thumb receiving member fixed to one edge of the body plate adjacent its outer end, a fixed cutter secured to the mounting plate, a rotatable cutter pivoted to the fixed cutter and to the mounting plate, said cutters and said mounting plate having notches, said cutters having cooperable cutting edges, a lever having its forward end pivoted to the rear end of the mounting plate, means for fastening the rear end of the lever to the forearm, and motion transmission means between the forward end of the lever and the rotatable cutter.

5. A clipping device including a mounting plate, means for fastening the mounting plate to the hand and wrist of the wearer, a fixed cutter secured to the mounting plate, a rotatable cutter pivoted to the fixed cutter and to the mounting plate, said cutters having co-operable edges shaped to close throughout their extent at approximately the same time, a lever fulcrumed to the rear end of the mounting plate, means for fastening the rear end of the lever to the forearm, and motion transmission means between the forward end of the lever and the rotatable cutter.

WALTER GOWER.